Figure 1:
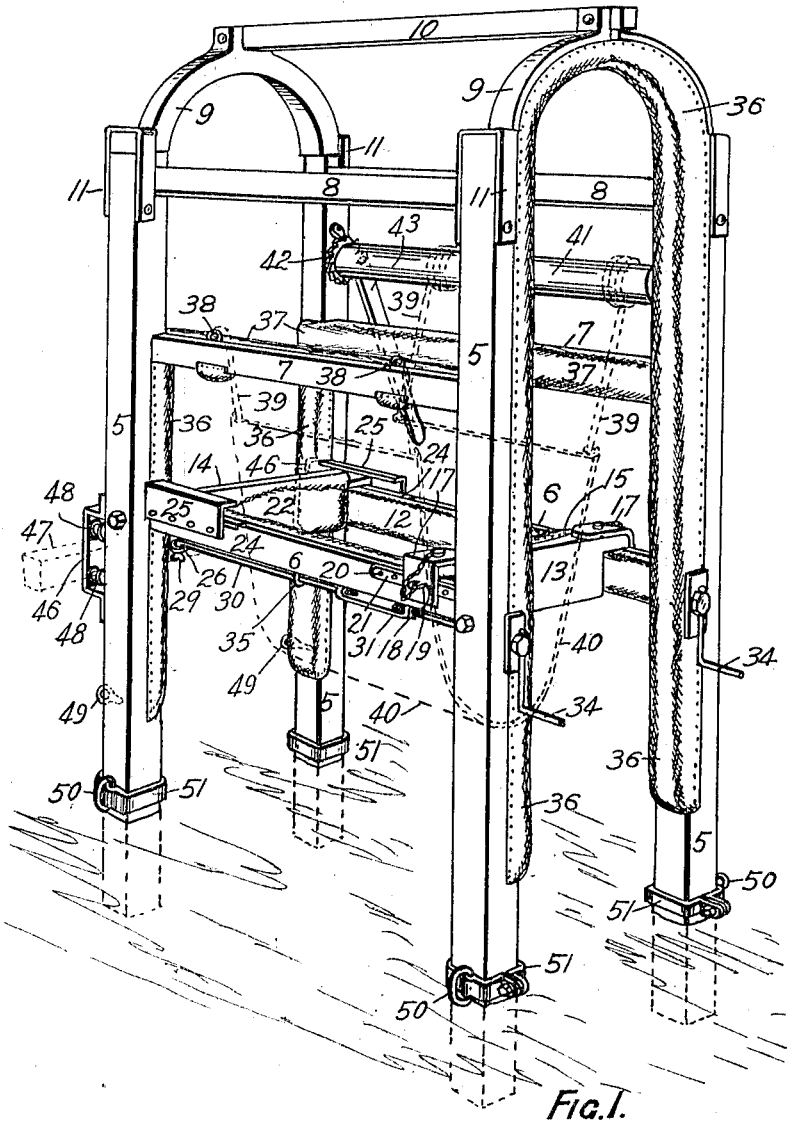

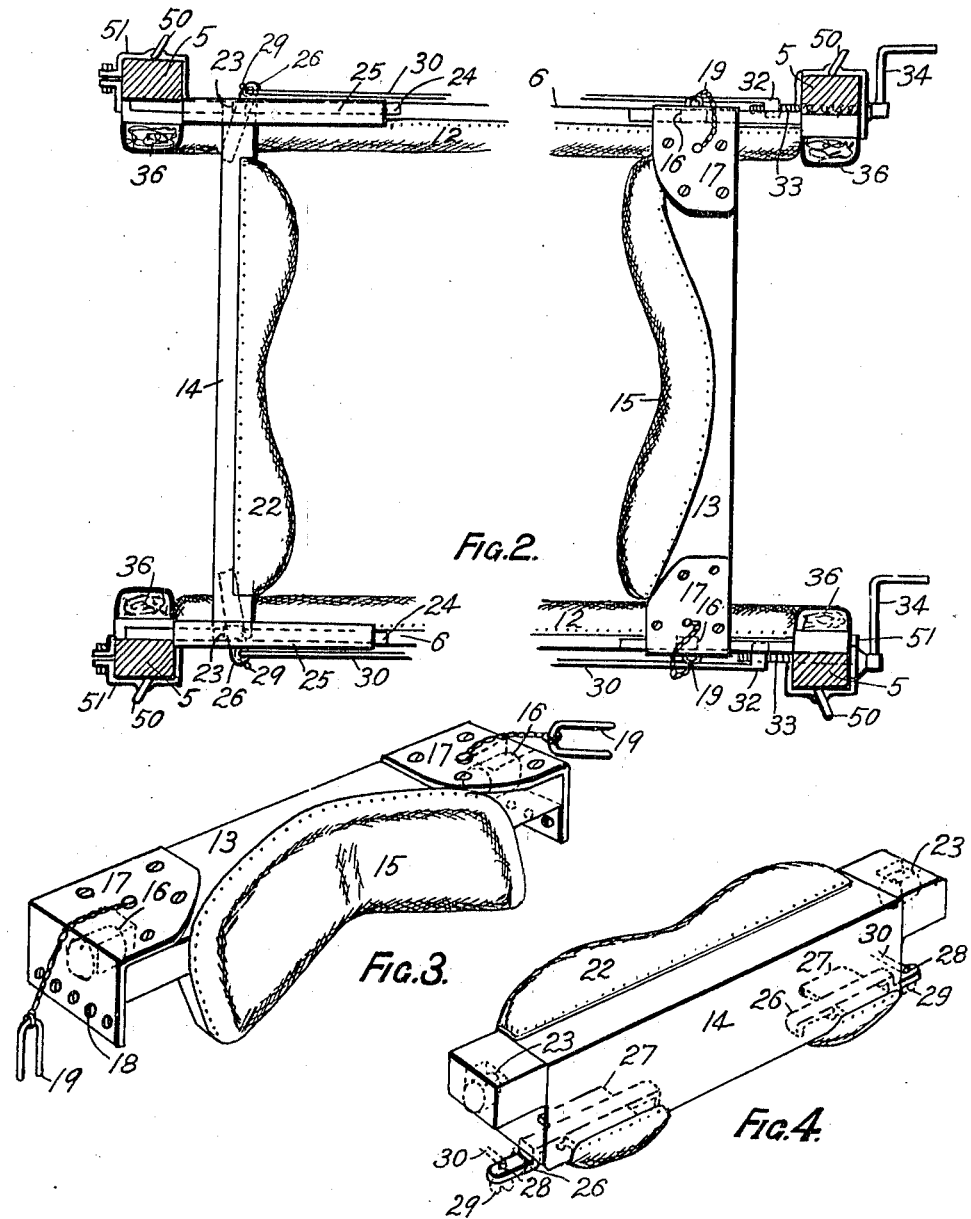

UNITED STATES PATENT OFFICE.

JOSEPH THOMAS WALLIS, OF SYDNEY, NEW SOUTH WALES, AUSTRALIA.

HORSE-HOLDER.

986,879.

Specification of Letters Patent. Patented Mar. 14, 1911.

Application filed June 3, 1909. Serial No. 500,040.

*To all whom it may concern:*

Be it known that I, JOSEPH T. WALLIS, a subject of the King of Great Britain, residing at Sydney, in the State of New South Wales and Commonwealth of Australia, have invented certain new and useful Improvements in Horse-Holders, of which the following is a specification.

This invention relates to improvements in holders in which restive horses may be more readily shod or sick or disabled animals readily treated and has been devised with the view to effectively carrying out these objects.

My invention comprises a substantial frame which can be rapidly adjusted to suit the particular animal so that it may be treated with safety.

I will however refer in detail to my improvements which are fully illustrated in the accompanying two sheets of drawings, Figure 1 being a perspective view, Fig. 2 a sectional plan, while Figs. 3 and 4 are perspective views of the breast bearer and hind quarter or rear bearer respectively.

The same numerals indicate the same or like parts throughout the drawings.

The frame consists of uprights 5 having longitudinal side bars 6, 7 and 8 connecting the same and end arches 9 carrying a top longitudinal stay 10 said arches being secured to said uprights by brackets 11. The lowermost bars 6 are provided with suitable padding 12 and support the breast bearer 13 and rear bearer 14. The breast bearer 13 has also padding 15 and has on its ends rollers 16 and angle pieces 17 each provided with a number of holes 18 for a staple 19 said holes being capable of alinement with holes 20 in plates 21 secured to the bars 6. The rear bearer 14 has also a padding 22 and end rollers 23 taking between the plates 24 and the angle iron plates 25 affixed to the bars 6. Below said bearer 14 are brackets 26 slidable in brackets 27 suitably padded over, brackets 26 being capable of retraction to permit the bearer 14 to be placed on the bars 6. These brackets 26 are then forced out and being provided with holes 28 for the hook ends of rods 30 are secured by the thumb or wing nuts 29. Said rods are provided with length adjusters 31, the screws 32 being acted upon by the screws 33 having bearings on the uprights and operated by the crank handles 34. The rods 30 have guide brackets 35. The uprights near to the rear bearers have suitable padding 36 reaching to the bars 7 which are also padded as shown at 37. One bar has eye bolts 38 for the ropes 39 of a sling 40, the other ends of the ropes 39 being wound upon the barrel 41 provided with a ratchet wheel 42 and operating handle 43.

The front uprights 5 have the padding 36 extending up and around the front arch 9 with the object of protecting the head of the animal when in the sling. The rear uprights have brackets 46 for a cross bar 47 thus enabling the frame with bearers 13 and 14 to be utilized as a pen or inclosure when not used otherwise. In the brackets 46 are sheaves 48 for the leg ropes which may be fastened to the rings 49.

The rings 50 on the bracket 51 on each of the uprights are for the purpose of securing the hobble straps.

It will be evident from the above that it will be a comparatively simple matter for a horse to be placed within the frame and secured so that it is possible to shoe the most unruly animal and that if necessary the sling may be effectively used to suspend a sick or disabled animal for the purpose of treatment without the risk of injury to itself or the operator.

Having thus described my invention what I claim as new and desire to cover by Letters Patent is:—

1. The combination, in a horse holder, of a frame comprising stationary uprights, and upper and lower pairs of horizontal side bars connecting the same; front and rear bearers supported upon the lower side bars, one bearer being movable toward and from the other; a windlass mounted in one side of the frame; and a sling having one end thereof connected to said windlass and its other end connected to the upper bar at the opposite side of the frame.

2. The combination, in a horse holder, of a frame comprising spaced uprights and horizontal side bars connecting the same; front and rear bearers supported upon said bars, one of said bearers being provided with brackets; rods connected at one end to said brackets; and devices connected to the other end of said rods for imparting an endwise movement thereto, to move said bearer toward and from the other bearer.

3. The combination, in a horse holder, of a frame comprising spaced uprights and horizontal side bars connecting the same;

front and rear bearers supported upon said bars, one of said bearers being provided with brackets; brackets slidably carried by the first-named brackets and arranged transversely of the bars; rods arranged longitudinally of said bars and connected at one end to said sliding brackets; and devices connected to the other end of said rods for imparting an endwise movement thereto, to move said bearer toward and from the other bearer.

In testimony whereof I have hereunto set my hand in presence of two subscribing witnesses.

JOSEPH THOMAS WALLIS.

Witnesses:
EDMUND WALWYN MAUND,
MABEL EUGENIE DE LAUGE.

Copies of this patent may be obtained for five cents each, by addressing the "Commissioner of Patents, Washington, D. C."